E. D. TUBBS.
SHAFT COUPLING.
APPLICATION FILED FEB. 15, 1921. RENEWED AUG. 11, 1922.
1,429,982.  Patented Sept. 26, 1922.
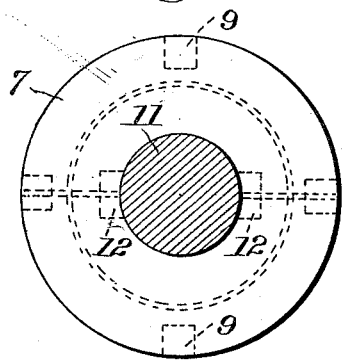
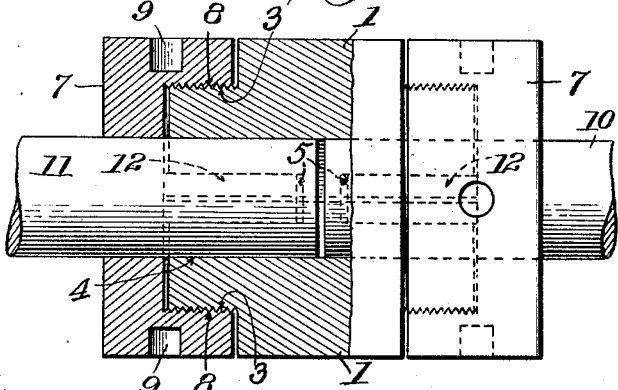
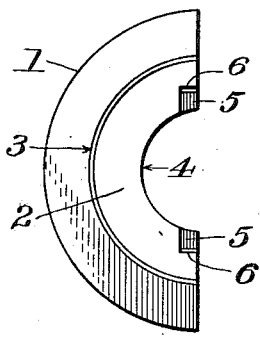
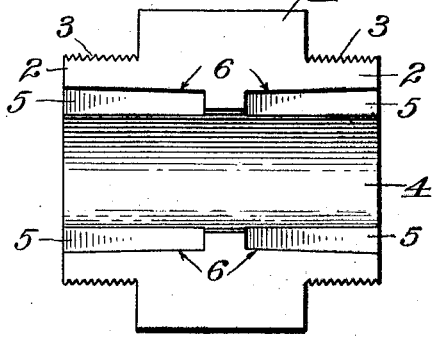
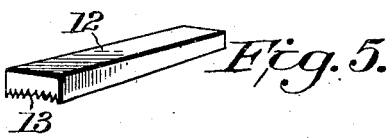
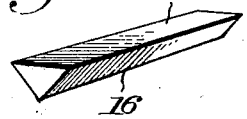
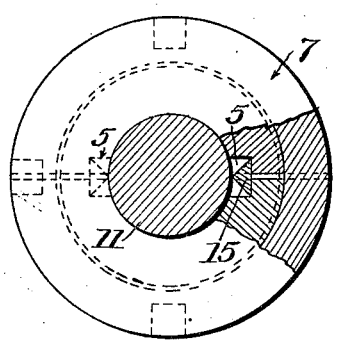
Inventor.
Earl D. Tubbs,
By Frederick V. Winters,
Attorney.

Patented Sept. 26, 1922.

1,429,982

UNITED STATES PATENT OFFICE.

EARL D. TUBBS, OF NEW YORK, N. Y., ASSIGNOR TO IGOE BROTHERS, OF NEWARK, NEW JERSEY, A CORPORATION OF NEW JERSEY.

SHAFT COUPLING.

Application filed February 15, 1921, Serial No. 445,115. Renewed August 11, 1922. Serial No. 581,265.

*To all whom it may concern:*

Be it known that I, EARL D. TUBBS, a citizen of the United States, and resident of New York, in the county and State of New York, have invented certain new and useful Improvements in Shaft Couplings, of which the following is a full, clear, and exact specification.

This invention relates to shaft couplings and has for its object to provide an improved and simplified coupling for connecting alined shafts.

It is the aim of the invention to provide a coupling which may be quickly applied and tightened without exerting excessive force to clamp the same to the shafts. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is an end view of the coupling constructed substantially in accordance with this invention, one of the shafts connected thereby being shown in section.

Figure 2 is a broken side view of the coupling and shafts.

Figure 3 is a detailed end view of one of the supplemental sleeve members of the coupling.

Figure 4 is an inner side view of the same.

Figure 5 is a detailed perspective view of one form of wedge.

Figure 6 is a broken end view of a modified form of coupling, and

Figure 7 is a detailed perspective view of a modified form of wedge.

The coupling comprises supplemental sleeve members 1 which together embrace or surround the ends of the shafts 10 and 11. Each sleeve member 1 has reduced end portions 2 which are screw-threaded at 3 to receive cap nuts 7 having internal threads 8 to engage said threads 3, as best shown in Fig. 2. Said nuts are provided with radial sockets 9 to receive a spanner wrench (not shown) for tightening the nuts on the sleeve members.

Grooves 5 are formed partially in each of the adjacent edges of the bores 4 of the sleeve members entering from opposite ends thereof and preferably terminating short of the center, as shown in Fig. 4. These grooves 5 have inclined outer walls 6 which gradually approach the axis of the bores as they extend inwardly from the ends of the sleeve members, thus giving the grooves 5 a tapering form. In these grooves 5 are fitted tapered wedges 12 having their inner faces curved to conform to the shafts and also serrated longitudinally, as at 13, Fig. 5, so as to effectively grip said shafts. When the nuts 7 are tightened up on the reduced ends of the sleeve members, the wedges 12 are forced into the tapering grooves 5 and the serrated faces of said wedges caused to bite into the shaft, thus locking said shafts to the coupling.

It will be noted that as the grooves 5 are formed at the juncture of the two sleeve members, there is no tendency for said members to be forced apart as the wedges are driven in by tightening the nuts, as would be the case if said grooves and wedges were arranged at other points in the sleeve members as, for instance, at points midway between the longitudinal edges of said sleeve members. It has been found by experiment that when the wedges are placed in the latter position there is a tendency for the nuts to bind on the threaded ends 2 of the sleeve members, because as the wedges are driven in they spread the sleeve members apart and make it necessary to exert excessive force to screw up the nuts. The arrangement of the wedges, as shown in Figures 1 and 2, is free from this objection, there being no tendency for the sleeve members to spread or the nuts to bind on the ends of said sleeve members, so that the nuts may be tightened up without the use of excessive force.

As shown in Figures 6 and 7, wedges 15 which are triangular in cross section, may be used in place of the form of wedge 12 shown in Figure 5. When the wedges 15 are used and driven into the tapered grooves 5 by the tightening of the nuts, the inner edges 16 of said wedges will bite into the shafts and effectively lock the same to the coupling, as was the case with the longitudinal serrations 13 of the wedges 12.

I claim:

1. In a shaft coupling, the combination with supplemental sleeve members having grooves in their bores extending inwardly from their ends, wedges in said grooves, and nuts on the ends of the sleeve members for forcing said wedges into the grooves to grip the shafts to be coupled, said wedges having longitudinal serrations in their inner faces to bite into said shafts.

2. In a shaft coupling, the combination with supplemental sleeve members having grooves in their bores extending inwardly from their ends, wedges in said grooves, and nuts on the ends of the sleeve members for forcing said wedges into the grooves to grip the shafts to be coupled, said wedges having means on their inner faces to bite into said shafts.

3. In a shaft coupling, the combination with supplemental sleeve members having inwardly tapering grooves in their bores extending inwardly from their ends, wedges in said grooves, and nuts on the ends of the sleeve members for forcing said wedges into the grooves to grip the shafts to be coupled.

4. In a shaft coupling, the combination with supplemental sleeve members having inwardly tapering grooves each formed partially in the adjacent edges of said sleeve members and extending inwardly from the ends thereof, of wedges fitted in said grooves and engaging both of said sleeve members, and nuts on the ends of the sleeve members for forcing the wedges into the grooves to grip the shafts to be coupled.

In testimony whereof I have signed my name to this specification.

EARL D. TUBBS.